Patented Oct. 12, 1937

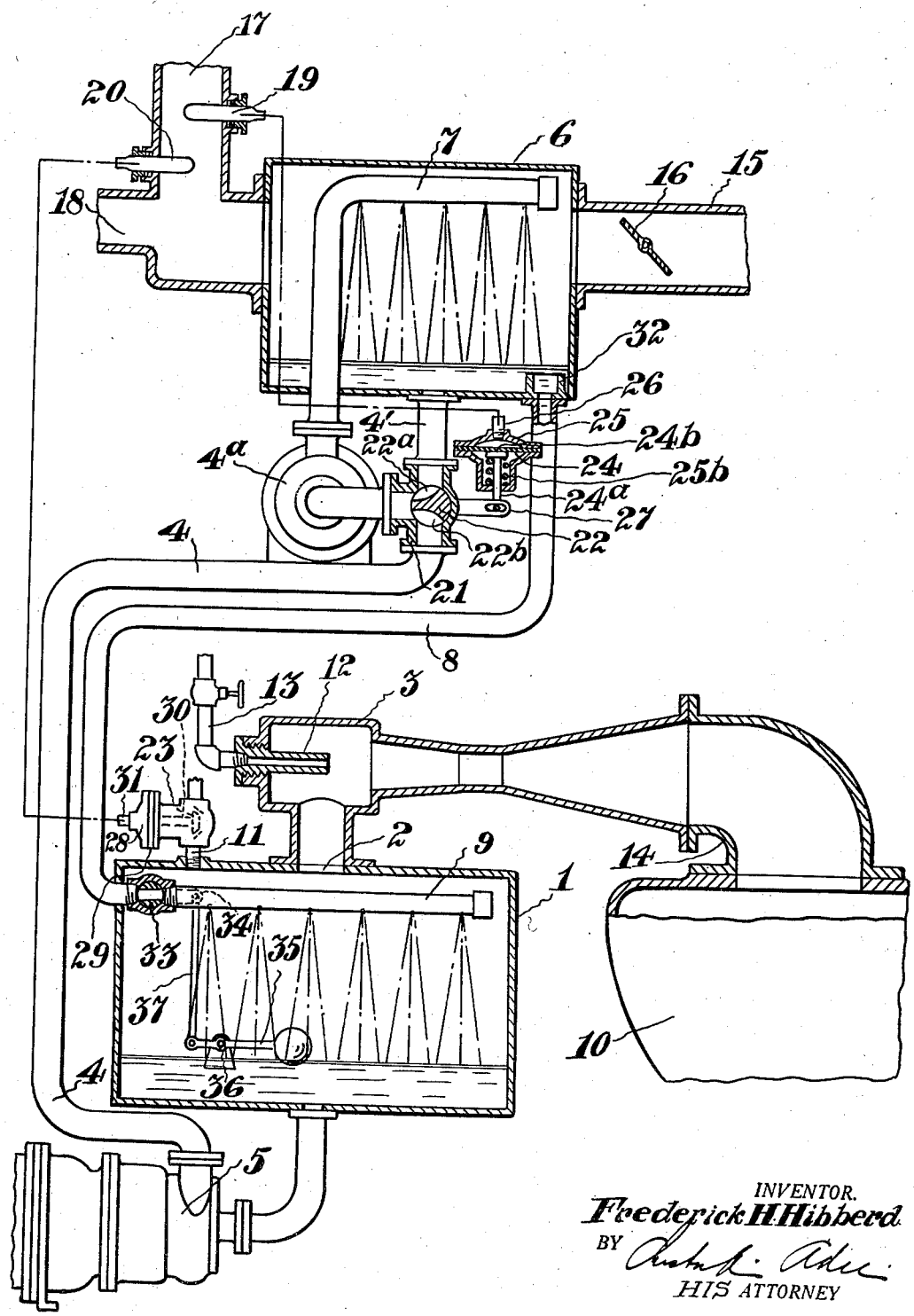

2,095,386

UNITED STATES PATENT OFFICE 2,095,386

METHOD AND APPARATUS FOR TREATING AIR

Frederick H. Hibberd, Larchmont, N. Y., assignor to Ingersoll-Rand Company, Jersey City, N. J., a corporation of New Jersey Application May 16, 1935, Serial No. 21,737

12 Claims. (Cl. 236—44)

The invention hereinafter set forth pertains generally to a method and apparatus for conditioning gaseous media, and particularly to a method of treating air and apparatus therefor to render the air suitable for ventilation or other purposes.

An object of the invention is to provide conditioning means for supplying dwellings, theaters, industrial establishments and other places frequented by human beings with air of the required humidity and temperature, in such a manner as to obviate all necessity for subjecting the resultant mass of air to the action of a separate heater or cooler as part of the conditioning means before delivering it to the space where it is to be utilized.

Another object of the invention is to provide means by which air can be controlled with regard to its humidity and temperature at a single point in its flow to the interior of the enclosure and in a single operation.

A further object of the invention is to provide means whereby air, instead of being subjected to a spray to cool and dehumidify it and then heated to a higher temperature than it usually has after spraying, can be rendered more or less humid and simultaneously varied in temperature. Thus regulation of the ventilating air is easily effected.

Another object is to provide appliances whereby the correct degree of temperature and humidity of the air is arrived at through the control of the composition of the medium by which the air is treated as demanded by changes of state in the place to be ventilated.

In its preferred form the system embraces a chamber through which fresh air and used air pass to the interior of a structure, and means for contacting the air with a liquid refrigerant in said chamber. Prior to its arrival at the chamber the temperature and composition of the refrigerant are so determined that the air in the chamber is reduced to the proper humidity and temperature before being delivered to the occupied space.

The construction of the invention hereinafter set forth comprises in brief a contacting chamber into which used air and fresh air pass, and means for supplying a refrigerant to said chamber. The refrigerant is a liquid containing a greater or smaller amount of a suitable substance such as calcium or lithium chloride to raise its boiling point. This liquid is cooled in an evaporator and is transferred therefrom to the contacting chamber and returned again to the evaporator after being used in said chamber. Exposed to the used air are a temperature-responsive device having a wet bulb and a similar device comprising a dry bulb, the former affecting the replenishment of the evaporated moisture and thus the strength and vaporizing point of the salt solution, and the latter the temperature of the solution delivered to the said chamber. The joint effect of the two devices is to control the temperature and humidity of the air stream. Usually the solvent in the refrigerant solution will be water.

Still another object of the invention is to provide controlling means by which the relative quantity of salt in the solution is altered as the humidity fluctuates and the wet-bulb device responds to the fluctuations, preferably by enlarging or reducing the amount of water used in the evaporator with a given mass of salt, so that the strength of the solution is changed. Hence, with a stronger or weaker solution, the humidity is adjusted and the temperature of the air is also governed to give ventilation of the best possible kind.

Other objects and advantages of the invention are made clear in the following description and the novel features are pointed out in the claims. This disclosure, however, is explanatory only and various alterations in shape, size and arrangement of parts and mode of operation can be adopted in practice without departing from the principle of the invention or exceeding the scope and spirit of the terms in which the claims are expressed.

On the drawing the figure shows in outline an apparatus in which the invention is embodied and illustrates the method of procedure.

The numeral 1 indicates a vessel, such as an evaporator, in which a high vacuum can be created to vaporize in part a liquid refrigerating medium, such as a salt solution, which runs into the evaporator. The vapor formed is removed through an outlet opening 2 by a steam jet ejector or other suitable means indicated at 3. The vaporization of part of the liquid chills the main body thereof, and this is withdrawn from the evaporator through a conduit 4 in the line of which is a pump 5. This pipe leads to an air-treating chamber 6 containing a spray pipe 7 through which the chilled liquid issues into the air flowing through this chamber. To avoid entrainment of the solution in the air stream it may be desirable to use a contacting means wherein spraying of the solution is avoided. But the principle of operation described herein will be unchanged.

The solution is returned to the evaporator through a pipe 8 which terminates in the evaporator 1 in a spray header 9 having jet openings so that the returning liquid can be finely divided and part of it again vaporized to cool the remainder to a desired degree. All the vapor created in the evaporator and removed by the ejector 3, is transferred to a condenser 10 to be again liquefied. To make up loss by vaporization in the evaporator 1, a replenishing pipe 11 delivers water to the interior of the evaporator as required. The ejector 3 has a steam-nozzle 12 therein which is supplied with steam from a hand-valve controlled pipe 13 and the conduit through which the ejector discharges into the condenser is shown at 14.

A by-pass pipe 4' preferably connects the bottom of the chamber 6 to the conduit 4 near the point where the latter enters the chamber, so that some of the refrigerating liquid can be recirculated through the chamber without returning through the pipe 8 to the evaporator 1, for a purpose to be described later.

From the chamber 6 a duct 15 leads to the enclosure to be supplied with conditioned gas, and this duct may have a damper valve 16 therein if desired. Some air in the enclosure of course goes out through the doors and windows, but the bulk of it is returned through a duct indicated at 17 which unites with a conduit 18 communicating with the atmosphere, to provide fresh air for the system. If necessary, the conduit 18 may be provided with a damper and other regulating devices (not shown) so that outside air in the required quantity and according to existing outside weather conditions can be obtained. The used air flowing through the connection 17 mixes with the fresh air coming in through the duct 18 and the mixture is transmitted to the spray chamber 6.

Suitable devices 19 and 20 sensitive to thermal and hygrometric changes, respectively, of gaseous media are preferably positioned in the used air duct 17. Each of these devices may be of any well-known type, and the thermally responsive device 19, shown as a dry-bulb thermostat, acts in response to the temperature of the used air to control the temperature of the solution entering the conditioning chamber 6. The hygrometrically responsive device 20, shown as a wet-bulb thermostat, acts in accordance with the humidity of the used air to control the degree of salt concentration in the solution admitted to the conditioning chamber 6.

The device 19 is connected to control a valve 22, the casing 21 of which is interposed in the pipe 4 and serves also as a connection between the pipe 4 and the by-pass 4'. When the temperature of the return air rises, the dry-bulb device causes the valve 22 to move toward such position that more cold solution from the evaporator 1 is directly discharged into the chamber 6. But when the temperature drops the valve 22 is turned so that less cold solution from the evaporator 1 and more warm solution from the by-pass 4' flows into the chamber 6 through the spray pipe 7. The valve 22 has passages 22a and 22b, the passage 22a opening from the pipe 4' into the pipe 4, and the passage 22b forming a connection between the parts of the pipe 4 connected to the casing 21. Between the casing 21 and the chamber 6 a pump 4a is connected into the line of the conduit 4, and the passages 22a and 22b both lead into that part of the pipe 4 leading from the casing 21 to the pump 4a. The valve 22 may act either to close the pipe 4' entirely or the pipe 4 between this casing 21 and the evaporator entirely, or to allow both to remain open together in varying degrees.

The valve 22 is shown provided with an arm 27 to be actuated by a diaphragm 24 mounted in a casing 25 which communicates with the device 19 through a piece of tubing 26. In the casing is a spring actuated stem 24a that is pinned to the arm 27. The spring 25b in the casing 25 normally presses upon a head 24b at the inner end of the stem 24a and tends to move the valve 22 so as to interrupt communication between the conduit 4 and the pump 4a. The purpose of this pump is to facilitate circulation from the valve casing 21 to the spray pipe 7 and back to the pump through the pipe 4'.

The device 19, tube 26 and the chamber formed by the diaphragm casing 25 contain suitable expansible fluid, and when the temperature of the air in the duct 17 varies, the pressure of the expansible fluid varies accordingly to actuate the diaphragm 24 and the valve 22 in the desired manner.

Similarly the wet-bulb device 20 is connected to control a valve 23 interposed in the pipe 11 supplying liquid to the evaporator. A tube 31 is shown connecting the device 20 to the casing 28 having therein a diaphragm 29 which bears on the outer end of the stem 30 of the valve 23. When humidity is high, the wet-bulb device registers a higher temperature and the fluid in this tube 31 will force the diaphragm inward and tend to close the valve 23. On the other hand when the wet-bulb temperature is low, the valve 23 will be operated to move to open position. Other means for operating the valves 22 and 23 in response to thermal and hygrometric conditions are well known to those skilled in the art, and accordingly it will be apparent that any suitable means capable of performing the desired functions, may be used.

Suppose the air in the enclosure to be ventilated has a temperature and humidity suitable for comfort in advance of the entrance of occupants. The devices 19 and 20 are adjusted so that they are now inactive. Hence valves 22 and 23 are held in such position that very little cold solution enters the chamber 6 from the evaporator 1 and the flow of make-up water in the pipe 11 is reduced in proportion to the decreased evaporation. The refrigerant now largely recirculates through the by-pass 4'. When a number of people enter, the air becomes warmer because heat is given off from the bodies of the inmates. As the temperature rises the dry-bulb device 20 now causes the diaphragm 24 to move the arm 27 downward, turning the valve 22 to close in part the by-pass 4' and to allow cold solution to pass into the chamber 6 from the evaporator 1 and be sprayed into the air to cool it.

Thus the temperature of the mixed air is kept within the comfort range. If air coming in from the outside through the duct 18, intermingling with the returned air, is relatively warm at times and adds considerably to the heat of the mixture the increase also appears in the air coming through the duct 17, and device 20 acts as before. Hence the air flowing through the casing 6 is cooled off before it is passed into the enclosure, by the action of the spray 7. A fan or the like is of course utilized to keep the air in motion through the conduit 15.

Likewise, with reference to the humidity of the air, it is obvious that if the used air returning by way of passage 17 is too moist, the temperature of the wet-bulb device will be correspondingly high and it will act upon the valve 23 to reduce the make-up water. Hence for a given amount of salt in the refrigerant, the diminution of the make-up water results in a stronger solution in the evaporator 1; that is to say, the quantity of salt present for a given amount of water will be greater and more salt in a given mass of water will be carried into the chamber 6. This stronger solution when sprayed in the chamber 6 will tend to absorb moisture from the air mixture and thus reduce the humidity.

When the humidity is lower than desired the wet-bulb temperature will be lower so that the valve 23 opens more to admit more water through the pipe 11 to the evaporator 1. The result is a weaker solution and less salt enters the chamber 6 and the refrigerant, for a given temperature, has more humidifying effect. The two devices 19 and 20 thus work together in the operation of the valves 22 and 23.

It is apparent from the foregoing that the control of the temperature and the humidity of the air for ventilation is accomplished at one and the same point, and separate reheating of the air passing to the chamber 6 and leaving same for the place of use is eliminated. The substance used in the refrigerant can be sodium hydroxide, lithium chloride, calcium chloride or any other chemical having similar hygroscopic qualities, and this in solution raises the temperature at which vaporization goes on in the evaporator 1. The temperature of the refrigerant delivered to the chamber 6 is correspondingly altered. The spray temperature in the chamber 6, and the temperature of the air leaving this chamber can thus be set at a selected point. Also through regulation of the make-up water by the valve 23 the moisture taken out of the air can be varied as conditions demand. Of course the principle of the invention can be utilized even if no fresh air were admitted, as it may be adapted to condition any kind of ventilating agent, such as fresh air only, used air only or a mixture of both, as described, or it may be used to condition gases other than air.

When the solution absorbs moisture from the air in the chamber 6 this moisture is of course conducted back to the evaporator 1 through the pipe 8, but it is not enough to make up for the loss by evaporation and removal of vapor to the condenser 10. In other words, the volume of vapor which is extracted by the steam jet evacuator 12 is much greater than the vapor that is absorbed in the chamber 6. Hence, the need of the replenishment connection 11.

The entrance to the pipe 8 in the casing 6 is surrounded by a flange or weir 32 of required height so that the chamber 7 will not be empty at no load. When the liquid therein sinks to such a level that the surface thereof is no higher than this weir, no more can flow back to the pipe through the evaporator 1. In the evaporator the header 9 is provided with a valve 33 having an outside arm 34, and within the evaporator is a lever 35 pivoted at 36. This lever has a float at one end and the other end is connected to the arm 34 by a link 37. So long as the level of liquid in the evaporator is high enough the valve 33 will be kept open and when the level sinks the float will close the valve 34. Hence when the liquid in chamber 7 no longer covers the weir 32 and no cold solution is delivered to the header 9 this valve can be closed to seal the evaporator 1 and prevent loss of the vacuum therein. With this construction the evaporator 1 is prevented from being open to the entrance of air through the pipe 8.

I claim:

1. The method of conditioning air which consists in producing contact between a volume of air and a volume of a hygroscopic solution, varying the concentration of the solution in response to the wet-bulb temperature of the air, and varying the temperature of the solution in response to the dry-bulb temperature of the air.

2. The method for cooling and drying a gas which consists in effecting contact between the gas and a hygroscopic solution, varying the temperature of the contacting solution in response to the thermometric condition of the gas, reconditioning the solution by subjecting it to the action of a vacuum to simultaneously cool and concentrate the solution, and varying the degree of concentration in response to the hygrometric condition of the gas.

3. Air conditioning apparatus comprising a conditioning chamber having an air inlet and outlet, means in the chamber introducing hygroscopic solution thereto, means removing spent solution therefrom, means wherein the spent solution is reconcentrated and chilled, means responsive to the wet-bulb temperature of the air to vary the degree of reconcentration, means to return renovated solution to the conditioning chamber, and means responsive to the dry-bulb temperature of the air to vary the temperature of the solution being introduced to the conditioning chamber.

4. In air conditioning apparatus, a conditioning chamber having an air inlet and outlet and wherein air comes into contact with a hygroscopic solution, a conduit removing spent solution therefrom and discharging to an evaporator wherein the spent solution is reconcentrated and chilled in a single step, means responsive to the wet-bulb temperature of the air to vary the degree of concentration of the solution, delivery means to return renovated solution to the conditioning chamber, and means responsive to the dry-bulb temperature of the air to divert part of the spent solution from said conduit into the delivery means to control the temperature of the solution being reintroduced into the chamber.

5. In air conditioning apparatus, a conditioning chamber having an air inlet and outlet and wherein air comes into contact with a hygroscopic solution, means removing part of the spent solution therefrom means to reconcentrate and chill said part of the solution, means responsive to the wet-bulb temperature of the air to vary the degree of concentration of the solution, delivery means to return renovated solution to the conditioning chamber, means adapted to inject spent solution from the chamber into said delivery means, and means responsive to the dry-bulb temperature of the air to control the amount of spent solution so injected thereby to control the temperature of the solution being reintroduced into the chamber.

6. The combination with gas conditioning apparatus having a chamber wherein the gas is treated with a conditioning medium, of means for controlling the properties of the medium admitted to the chamber comprising means acting in accordance with the hygrometric condition of the gas to vary the composition of the medium, and means acting in accordance with the tem-